Patented Aug. 17, 1954

2,686,751

UNITED STATES PATENT OFFICE 2,686,751

VITAMIN A STABILIZATION

Norris D. Embree and Henry M. Kascher, Rochester, N. Y., assignors to Eastman Kodak Company, Rochester, N. Y., a corporation of New Jersey No Drawing. Application May 10, 1952,
Serial No. 287,254

12 Claims. (Cl. 167—81)

This invention relates to the stabilization of vitamin A against loss in potency and is particularly concerned with vitamin A compositions containing stabilizers therefor.

Vitamin A, whether in alcohol, ester or other well-known form, is normally subject to objectionable loss in vitaminic potency upon prolonged storage unless it is stabilized in some way. The stabilization is complicated because many of the well-known materials which are commonly used for stabilizing fats or the like against oxidation are largely ineffective in stabilizing either natural or synthetic vitamin A compositions against loss in potency, whether or not such compositions include a fatty oil vehicle. Potency losses in vitamin A compositions are particularly serious because of the high value of vitamin A.

The potency stabilization of vitamin A is of particular importance in the highly potent vitamin A preparations normally sold for incorporation into foods, for use in multi-vitamin preparations or the like, or for other pharmaceutical uses, since the tendency toward potency loss is aggrevated by increasing concentration. The most common commercial vitamin A compositions are the fatty esters of vitamin A prepared as concentrates from fish liver oils or the like, or vitamin A acetate or vitamin A palmitate prepared by synthesis, and including concentrates diluted to the desired potency. In this application the term "vitamin A" will be understood to include any of the well-known vitamin A active materials, whether prepared from natural sources or by synthesis and whether in alcohol, ester or other well-known form such as the aldehyde or ether. The invention is of particular importance in the stabilization of those vitamin A compositions having a vitamin A potency of at least a million units of vitamin A per gram but is also applicable to lower potency concentrates such as those having potencies of 10,000 international units of vitamin A per gram or lower. The invention also includes vitamin A compositions containing an edible fat or oil such as is present in natural oil concentrates or in synthetically prepared concentrates having the potency adjusted to a desired value with an edible oil such as cottonseed oil or the like.

It is accordingly an object of this invention to provide vitamin A compositions having improved stability against objectionable losses in potency.

It is another object of the invention to provide new compositions comprising vitamin A active material normally subject to deleterious potency losses and containing highly effective stabilizers from such vitamin A.

It is a further object of the invention to provide compositions comprising vitamin A stabilized with a new combination of stabilizers which are much more effective than any of the individual stabilizer components alone.

Another object of the invention is to make possible the use in vitamin A stabilization of material hitherto ineffective for such use, by the inclusion therewith of material exhibiting a synergistic action with such material.

Another object of the invention is to advance vitamin A technology.

Another object of the invention is to minimize the costly losses in potency normally encountered with highly valuable vitamin A compositions.

Another object of the invention is to ensure fortification of foods with a high level of vitamin A by providing vitamin A concentrates having a minimal loss in potency during shipment and storage.

Other objects will be apparent from the description and claims which follow.

These and other objects are attained by means of this invention which comprises stabilizing vitamin A against objectionable losses in potency by incorporating in vitamin A compositions a relatively high concentration of a synergistic stabilizer mixture comprising at least 1% by weight of a monoester of citric acid and at least 1% of phenolic antioxidant, both based on the weight of vitamin A active material.

Citric acid monoesters such as monoisopropyl citrate, monostearyl citrate, mono-n-propyl citrate, mono-n-butyl citrate, monoethyl citrate, monoisobutyl citrate, monolauryl citrate, monooleyl citrate and the like have been used for stabilizing fats against oxidation but have heretofore been largely ineffective, even at high concentrations, for stabilizing vitamin A against potency losses. We have now discovered that when such citric acid monoesters are admixed with one or more of the phenolic antioxidants such as the tocopherols, alkyl gallates, hydroquinones, alkylated hydroxy anisoles or similar well-known phenolic antioxidants, the resulting stabilizer mixture imparts greatly improved potency stability to vitamin A compositions provided such mixture is employed in amounts of at least 1% of each of the citric acid monoester and the phenolic antioxidant based on the weight of vitamin A being stabilized. Optimum results are obtained by using each component of the stabilizer mixture in amounts of from 3% to 30% by weight based on the weight of vitamin A.

The citric acid monoester can be added as such to vitamin A compositions containing a substantial proportion of edible, oil-miscible vehicle but is desirably added to the vitamin A composition as a solution in a vehicle which is both edible and oil-miscible; suitable vehicles including glyceride oils such as cottonseed oil, soybean oil or the like, and preferably monoglycerides such as are commonly prepared by alcoholysis of a triglyceride, such as an animal fat or vegetable oil, with glycerine.

Greatly improved potency stability is obtained with amounts of stabilizer down to 1% by weight of citric acid monoester and 1% by weight of phenolic antioxidant based on the weight of vitamin A although amounts of each of the stabilizer components of as much as 5%, 10%, 20% or even 30% by weight or higher based on the weight of vitamin A can be used and are desirably used where greatly prolonged stability is desired.

Particularly efficacious results are obtained by use of two or more phenolic antioxidants in conjunction with the citric acid monoester, and one of such antioxidants is desirably a tocopherol. It is usually desirable to employ a higher percentage of phenolic antioxidant than citric acid monoester although the proportions can be varied over wide ranges if desired.

The data set out in Table 1 illustrates the stability of compositions embodying this invention as compared to unstabilized vitamin A concentrate or vitamin A concentrate stabilized with various single stabilizers. The vitamin A concentrate employed was a synthetic vitamin A palmitate concentrate (78% vitamin A palmitate) having an initial potency of 1,400,000 vitamin A units per gram. The potency stability was evaluated by the so-called "Rocker stability test" which comprises rocking a tube of concentrate at 55° C. with the sample exposed to air and checking the potency periodically by the standard "blue color" assay method using antimony trichloride.

Table 1

| Stabilizer | Percent Potency after 17.5 hrs. | Percent Potency after 35 hrs. |
| --- | --- | --- |
| None | 55.1 | 30.5 |
| 3.8% Isopropyl citrate | 62.1 | 37.3 |
| 3.8% Tocopherol | 69.9 | 46.0 |
| 3.8% Butylated hydroxy anisole | 77.9 | 57.1 |
| 3.8% Tocopherol+3.8% Isopropyl citrate | 86.4 | 72.4 |
| 3.8% Butylated hydroxy anisole+3.8% Isopropyl citrate | 87.9 | 79.7 |

It is apparent from Table 1 that citric acid monoester alone gives but slight improvement in potency stability whereas synergistic mixtures of the citrate monoester and phenolic anti-oxidant give greatly improved potency stability over a prolonged period.

At levels of citric acid monoester and phenolic anti-oxidant respectively below about 1% by weight based on the weight of vitamin A, the synergistic enhancement of potency stability and the high level maintenance of potency for prolonged periods is not apparent. Thus a sample of vitamin A palmitate admixed with 0.96% by weight of tocopherol and 0.96% by weight of monoisopropyl citrate gave the results shown in Table 2 when subjected to the accelerated Rocker stability test described heretofore.

Table 2

| Additive | Percent Potency 17.5 hrs. | Percent Potency 35 hrs. | Percent Potency 52.5 hrs. |
| --- | --- | --- | --- |
| 0.96% Tocopherol+0.96% Monoisopropyl citrate | 72.4 | 42.6 | 25.3 |

At low levels of vitamin A such are found in vitamin A fortified oils and fats, such as margarine or similar products, high level potency maintenance over prolonged periods is particularly important since such products normally undergo a much longer storage period than do the highly potent vitamin A concentrates which are used in the manufacture of such products. In such products, it is common practice to employ high percentages of stabilizer based on the weight of vitamin A. Thus, for example, a salad oil, such as cottonseed oil, fortified with 10,000 units of vitamin A acetate per gram (0.37% by weight of vitamin A acetate based on the total composition weight) normally contains tocopherol in an amount of about 30% by weight based on the weight of the vitamin A acetate. The greatly enhanced results attained by means of this invention with compositions of this dilution are shown in Table 3, as determined by the Rocker stability test. The weights given in the table are weight of material per 100 grams of composition.

Table 3

| Sample | Wt. of Vit. A Acetate, g. | Wt. of Additive | Percent Vitamin A Recovery | | |
| --- | --- | --- | --- | --- | --- |
| | | | 52.5 hrs. | 87.5 hrs. | 105.5 hrs. |
| 1 | 0.37 | 0.1 g. Tocopherol | 87.9 | 48.2 | 0.0 |
| 2 | 0.37 | 0.1 g. Tocopherol; 0.1 g. Monoisopropyl citrate | 94.4 | 76.2 | 67.3 |
| 3 | 0.37 | 0.1 g. Tocopherol; 0.1 g. Monoisopropyl citrate; 0.05 g. Butylated hydroxy anisole | 93.7 | 78.2 | 72.2 |
| 4 | 0.37 | 0.1 g. Tocopherol; 0.1 g. Butylated hydroxy anisole; 0.1 g. Monoisopropyl citrate | 93.8 | 85.7 | 78.3 |
| 5 | 0.37 | 0.1 g. Tocopherol; 0.05 g. Propyl gallate; 0.1 g. Monoisopropyl citrate | 98.1 | 95.1 | 94.2 |

In low level vitamin A compositions such as are illustrated in Table 3, vitamin A normally shows much less tendency to lose potency than in the highly potent concentrates. At the same time, much higher percentages of stabilizer based on the weight of vitamin A are desirably employed. Thus, when the vitamin A acetate at 10,000 units per gram is stabilized with 27% by weight of tocopherol based on the weight of vitamin A acetate, the potency drops to zero after 105.5 hours as shown in Table 3, sample 1. The composition (sample 2) employing citric acid monoester in conjunction with the tocopherol, however, still retains 67.3% of its original potency after 105.5 hours. As can be seen by comparing samples 2, 3 and 4, however, increasing the concentration of phenolic antioxidant by as much as 100% or to a total of 54% of phenolic antioxidant based on the weight of vitamin A does not greatly affect the potency stability over the 105.5 hour accelerated test period. Particularly good results are obtained by using a mixture of tocopherol and propyl gallate in a synergistic mixture with citric acid monoester as illustrated by sample 5 in Table 3.

Thus, by means of this invention, vitamin A compositions of improved stability against objectionable potency losses are provided utilizing synergistic stabilizing mixtures as described hereinabove.

While the invention has been described in considerable detail with reference to certain preferred embodiments thereof, it will be understood that variations and modifications can be effected within the spirit and scope of the invention as described hereinabove and as defined in the appended claims.

We claim:

1. A vitamin A composition of improved stability and comprising vitamin A having admixed therewith at least 1% by weight of monoalkyl ester of citric acid and at least 1% by weight of phenolic antioxidant selected from the group of hydroxylated aromatic compounds consisting of tocopherols, alkyl gallates, butylated hydroxy anisole, and hydroquinone, both based on the weight of said vitamin A.

2. A vitamin A composition having improved stability against loss in potency and comprising vitamin A in ester form having admixed therewith at least 1% by weight of monoisopropyl citrate and at least 1% by weight of phenolic antioxidant selected from the group of hydroxylated aromatic compounds consisting of tocopherols, alkyl gallates, butylated hydroxy anisole, and hydroquinone, both based on the weight of said vitamin A.

3. A vitamin A composition having improved stability against loss in potency and comprising vitamin A in ester form having admixed therewith at least 1% by weight of a monoalkyl ester of citric acid and at least 1% by weight of phenolic antioxidant selected from the group of hydroxylated aromatic compounds consisting of tocopherols, alkyl gallates, butylated hydroxy anisole, and hydroquinone, both based on the weight of said vitamin A, said monoalkyl ester of citric acid being dissolved in an edible, oil-miscible glyceride vehicle, said phenolic antioxidant consisting at least in part of a tocopherol.

4. A vitamin A composition having improved stability against loss in potency and comprising vitamin A in ester form having admixed therewith at least 1% by weight of monoisopropyl citrate and at least 1% by weight of tocopherol.

5. A vitamin A composition having improved stability against loss in potency and comprising synthetic vitamin A in the form of a fatty acid ester, at least 1% by weight of an alkyl monoester of citric acid based on the weight of said vitamin A, and at least 1% by weight of phenolic antioxidant based on the weight of said vitamin A and being selected from the group of hydroxylated aromatic compounds consisting of tocopherols, alkyl gallates, butylated hydroxy anisole, and hydroquinone.

6. A vitamin A composition stabilized by admixture therewith of at least 1.5% of monoisopropyl citrate and at least 3.0% of tocopherol, both based on the weight of vitamin A active material in said composition.

7. A vitamin A composition stabilized by admixture therewith of at least 1% by weight of monoisopropyl citrate and at least 1% by weight of phenolic antioxidant, both based on the weight of vitamin A active material in said composition, said phenolic antioxidant comprising butylated hydroxy anisole.

8. A vitamin A composition stabilized by admixture therewith of at least 1% by weight of monoisopropyl citrate and at least 1% by weight of phenolic antioxidant, both based on the weight of vitamin A active material in said composition, said phenolic antioxidant comprising propyl gallate.

9. A vitamin A composition stabilized by admixture therewith of at least 1% by weight of monoisopropyl citrate and at least 1% by weight of phenolic antioxidant, both based on the weight of vitamin A active material in said composition, said phenolic antioxidant comprising hydroquinone.

10. A vitamin A composition having improved stability against loss in potency and comprising vitamin A in ester form having admixed therewith at least 1% by weight of monoalkyl citrate and at least 1% by weight of a mixture of tocopherol and butylated hydroxy anisole based on the weight of said vitamin A.

11. A vitamin A composition having improved stability against loss in potency and comprising vitamin A in ester form having admixed therewith at least 1% by weight of monoalkyl citrate and at least 1% of a mixture of tocopherol and propyl gallate based on the weight of said vitamin A.

12. A vitamin A composition having admixed therewith at least 1% by weight of monoalkyl citrate and at least 1% by weight of a mixture of propyl gallate and butylated hydroxy anisole, both based on the weight of vitamin A active material in said composition.

References Cited in the file of this patent

UNITED STATES PATENTS

| Number | Name | Date |
|---|---|---|
| 2,485,640 | Vahlteich | Oct. 25, 1949 |
| 2,563,835 | Gribbins | Aug. 14, 1951 |
| 2,578,649 | Vahlteich | Dec. 11, 1951 |